(12) United States Patent
Ballato et al.

(10) Patent No.: US 7,463,329 B2
(45) Date of Patent: Dec. 9, 2008

(54) MATERIALS FOR FREEZING LIGHT

(75) Inventors: Arthur Ballato, Oceanport, NJ (US);
John Ballato, Clemson, SC (US)

(73) Assignees: Clemson University, Anderson, SC (US); United States of America as represented by the Secretary of the Army, Washington, DC (US)

( * ) Notice: Subject to any disclaimer, the term of this patent is extended or adjusted under 35 U.S.C. 154(b) by 480 days.

(21) Appl. No.: 11/336,397

(22) Filed: Jan. 20, 2006

(65) Prior Publication Data

US 2006/0158603 A1 Jul. 20, 2006

Related U.S. Application Data

(60) Provisional application No. 60/645,292, filed on Jan. 20, 2005.

(51) Int. Cl.
*G02F 1/13* (2006.01)
*G02B 5/18* (2006.01)

(52) U.S. Cl. .................. 349/169; 349/170; 349/187; 349/193; 359/576; 359/589

(58) Field of Classification Search ............... 349/169, 349/167, 170, 193, 198, 201, 202, 187, 191; 359/575, 576, 578, 589, 197
See application file for complete search history.

(56) References Cited

U.S. PATENT DOCUMENTS

| | | | |
|---|---|---|---|
| 5,153,761 A * | 10/1992 | Marlor | .............. 349/25 |
| 5,494,604 A | 2/1996 | Chung | |
| 5,906,770 A | 5/1999 | Amundson et al. | |
| 6,036,882 A | 3/2000 | Chung | |
| 6,701,048 B2 | 3/2004 | Figotin et al. | |
| 7,253,696 B2 * | 8/2007 | Krowne | .............. 333/24.2 |
| 2005/0008308 A1 * | 1/2005 | Bita et al. | .............. 385/123 |
| 2006/0158603 A1 * | 7/2006 | Ballato et al. | .............. 349/193 |

OTHER PUBLICATIONS

Dissertation of Prapong Klysubun entitled *Nonlinear Optical Studies of Dye-Doped Nematic Liquid Crystals*, Mar. 28, 2002, pp. 1-150.
Abstract of Article—*Noncentrosymmetric Oxides*, Halasyamani et al., Chem. Mater., 10(10), 1998, pp. 2753-3769.
Article—*3-0: A New Composite Connectivity*, Pilgrim et al., 1986, pp. 314-317.
Article—Draft 16 of A Working Document for a Proposed Standard to be entitled: *IEEE Standard Definitions of Terms Associates with Ferroelectric and Related Materials*, IEEE Transactions on Ultrasonics, Ferroelectrics, and Frequency Control, vol. 50, No. 12, Dec. 2003, pp. 1-32.
Article—*Electromagnetic unidirectionality in magnetic photonic crystals*, Figotin et al., Physical Review B, vol. 67, 2003, pp. 165210-1-165210-20.

(Continued)

*Primary Examiner*—Brian M Healy
(74) *Attorney, Agent, or Firm*—Dority & Manning, P.A.

(57) ABSTRACT

Recent theoretical investigations have predicted the existence of axially frozen modes that arise when light is incident upon an anisotropic two-dimensional photonic crystal. Such electromagnetic modes are of interest since they suggest a near-zero group velocity with extraordinary amplitudes. The present invention addresses the crystal physics associated with realizing such effects and provides for the development of materials suitable for use in the forming photonic crystals that can exhibit such effects.

20 Claims, 4 Drawing Sheets

OTHER PUBLICATIONS

Article—*Frozen light in periodic stacks of anisotropic layers*, Ballato et al., Physical Review E, vol. 71, 2005, pp. 036612-1-036512-12.

Article—*Oblique frozen modes in periodic layered media*, Figotin et al., Physical Review E, vol. 68, 2003, pp. 036609-1-036609-16.

Article—*Piezoelectricity: Old Effect, New Thrusts*, Arthur Ballato, IEEE Transactions on Ultrasonics, Ferroelectrics, and Frequency Control, vol. 42, No. 5, Sep. 1995, pp. 916-926.

Article—*Tailored Domains in Quartz and other Piezoelectrics*, Newnham et al.

* cited by examiner

FIG. 1

| System | {0 0 0} | {φ 0 0} | {0 θ 0} | {0 0 ψ} |
|---|---|---|---|---|
| II | $[0\,\varepsilon_{13}\,0]$ | $[\varepsilon_{23}\,\varepsilon_{13}\,\varepsilon_{12}]$ | $[\varepsilon_{23}\,\varepsilon_{13}\,\varepsilon_{12}]$ | $[0\,\varepsilon_{13}\,0]$ |
| III | $[0\,0\,0]$ | $[0\,0\,\varepsilon_{12}]$ | $[\varepsilon_{23}\,0\,0]$ | $[0\,\varepsilon_{13}\,0]$ |
| IV-V-VI | $[0\,0\,0]$ | $[0\,0\,0]$ | $[\varepsilon_{23}\,0\,0]$ | $[0\,\varepsilon_{13}\,0]$ |

FIG. 2A

| System | {0 θ ψ} | {φ 0 ψ} | {φ θ 0} | {φ θ ψ} |
|---|---|---|---|---|
| II | $[\varepsilon_{23}\,\varepsilon_{13}\,\varepsilon_{12}]$ | $[\varepsilon_{23}\,\varepsilon_{13}\,\varepsilon_{12}]$ | $[\varepsilon_{23}\,\varepsilon_{13}\,\varepsilon_{12}]$ | $[\varepsilon_{23}\,\varepsilon_{13}\,\varepsilon_{12}]$ |
| III | $[\varepsilon_{23}\,\varepsilon_{13}\,\varepsilon_{12}]$ | $[\varepsilon_{23}\,\varepsilon_{13}\,\varepsilon_{12}]$ | $[\varepsilon_{23}\,\varepsilon_{13}\,\varepsilon_{12}]$ | $[\varepsilon_{23}\,\varepsilon_{13}\,\varepsilon_{12}]$ |
| IV-V-VI | $[\varepsilon_{23}\,\varepsilon_{13}\,\varepsilon_{12}]$ | $[0\,\varepsilon_{13}\,0]$ | $[\varepsilon_{23}\,0\,0]$ | $[\varepsilon_{23}\,\varepsilon_{13}\,\varepsilon_{12}]$ |

FIG. 2B

| System | Rotation by: φ = 45 degrees | Rotation by: θ = 45 degrees | Rotation by: ψ = 45 degrees |
|---|---|---|---|
| II | $\begin{bmatrix} \frac{\varepsilon_{11}+\varepsilon_{22}}{2} & \frac{\varepsilon_{22}-\varepsilon_{11}}{2} & \frac{\varepsilon_{13}}{\sqrt{2}} \\ \frac{\varepsilon_{22}-\varepsilon_{11}}{2} & \frac{\varepsilon_{11}+\varepsilon_{22}}{2} & \frac{-\varepsilon_{13}}{\sqrt{2}} \\ \frac{\varepsilon_{13}}{\sqrt{2}} & \frac{-\varepsilon_{13}}{\sqrt{2}} & \varepsilon_{33} \end{bmatrix}$ | $\begin{bmatrix} \varepsilon_{11} & \frac{\varepsilon_{13}}{\sqrt{2}} & \frac{\varepsilon_{13}}{\sqrt{2}} \\ \frac{\varepsilon_{13}}{\sqrt{2}} & \frac{\varepsilon_{22}+\varepsilon_{33}}{2} & \frac{\varepsilon_{33}-\varepsilon_{22}}{2} \\ \frac{\varepsilon_{13}}{\sqrt{2}} & \frac{\varepsilon_{33}-\varepsilon_{22}}{2} & \frac{\varepsilon_{22}+\varepsilon_{33}}{2} \end{bmatrix}$ | $\begin{bmatrix} \frac{(\varepsilon_{11}+\varepsilon_{33})}{2}-\varepsilon_{13} & 0 & \frac{(\varepsilon_{11}-\varepsilon_{33})}{2} \\ 0 & \varepsilon_{22} & 0 \\ \frac{(\varepsilon_{11}-\varepsilon_{33})}{2} & 0 & \frac{(\varepsilon_{11}+\varepsilon_{33})}{2}+\varepsilon_{13} \end{bmatrix}$ |
| III | $\begin{bmatrix} \frac{\varepsilon_{11}+\varepsilon_{22}}{2} & \frac{\varepsilon_{22}-\varepsilon_{11}}{2} & 0 \\ \frac{\varepsilon_{22}-\varepsilon_{11}}{2} & \frac{\varepsilon_{11}+\varepsilon_{22}}{2} & 0 \\ 0 & 0 & \varepsilon_{33} \end{bmatrix}$ | $\begin{bmatrix} \varepsilon_{11} & 0 & 0 \\ 0 & \frac{\varepsilon_{22}+\varepsilon_{33}}{2} & \frac{\varepsilon_{33}-\varepsilon_{22}}{2} \\ 0 & \frac{\varepsilon_{33}-\varepsilon_{22}}{2} & \frac{\varepsilon_{22}+\varepsilon_{33}}{2} \end{bmatrix}$ | $\begin{bmatrix} \frac{\varepsilon_{11}+\varepsilon_{33}}{2} & 0 & \frac{\varepsilon_{11}-\varepsilon_{33}}{2} \\ 0 & \varepsilon_{22} & 0 \\ \frac{\varepsilon_{11}-\varepsilon_{33}}{2} & 0 & \frac{\varepsilon_{11}+\varepsilon_{33}}{2} \end{bmatrix}$ |
| IV-V-VI | $\begin{bmatrix} \varepsilon_{11} & 0 & 0 \\ 0 & \varepsilon_{11} & 0 \\ 0 & 0 & \varepsilon_{33} \end{bmatrix}$ | $\begin{bmatrix} \varepsilon_{11} & 0 & 0 \\ 0 & \frac{(\varepsilon_{11}+\varepsilon_{33})}{2} & \frac{(\varepsilon_{33}-\varepsilon_{11})}{2} \\ 0 & \frac{(\varepsilon_{33}-\varepsilon_{11})}{2} & \frac{(\varepsilon_{22}+\varepsilon_{33})}{2} \end{bmatrix}$ | $\begin{bmatrix} \frac{(\varepsilon_{11}+\varepsilon_{33})}{2} & 0 & \frac{(\varepsilon_{11}-\varepsilon_{33})}{2} \\ 0 & \varepsilon_{11} & 0 \\ \frac{(\varepsilon_{11}-\varepsilon_{33})}{2} & 0 & \frac{(\varepsilon_{11}+\varepsilon_{33})}{2} \end{bmatrix}$ |

MATERIALS FOR FREEZING LIGHT

CROSS REFERENCE TO RELATED APPLICATIONS

This application claims benefit to U.S. Provisional Patent Application Ser. No. 60/645,292 filed Jan. 20, 2005.

STATEMENT OF GOVERNMENT SPONSORED RESEARCH

The captioned invention was made with Government support under N66001-03-1-8900 awarded by the Office of Naval Research. The Government has certain rights in this invention

BACKGROUND OF THE INVENTION

Photonic crystals are structures that possess spatial periodicities in refractive index, which lead to allowed and forbidden directions for light of certain energy and polarization to propagate. They have been the subject of considerable research and development efforts around the world due to their potential for controlling light in ways that cannot be achieved using homogeneous structures. Examples of extraordinary optical phenomena enabled by photonic crystals include reversed Doppler shifts, divergent-less superlenses, negative refraction, and huge Verdet constants, to name just a few.

Recent theoretical investigations have predicted the existence of axially frozen modes that arise when light is incident upon an anisotropic two-dimensional photonic crystal. In theory, frozen modes can occur when the electromagnetic dispersion relationship, $\omega(k)$, exhibits a stationary inflection point. In this case, the group velocity approaches zero with negligible (possibly zero) reflections from the structure's surface and the mode amplitude within the photonic crystal structure can exceed that of the incident wave by several orders of magnitude. Such electromagnetic modes are of interest since they suggest a near-zero group velocity with extraordinary amplitudes.

Figotin, et al. (U.S. Pat. No. 6,701,048, which is incorporated herein by reference) discloses unidirectional gyrotropic photonic media that can allow axially frozen modes. The media include a sequence of parallel layers of two types of dielectric materials arranged in an alternating pattern, one material with an isotropic permittivity and the other with a permittivity tensor referred to the laboratory system with at least one non-zero off-diagonal element (i.e., $\epsilon_{12}$ and/or $\epsilon_{23} \neq 0$). Unfortunately, few naturally occurring dielectric materials meet the criteria including having off-diagonal $\epsilon$ elements so as to satisfy the permittivity requirement of the media disclosed in Figotin, et al. For example, possible naturally occurring materials could include certain crystals in triclinic or monoclinic classes. The patent discloses that some generic ferrite materials are available for use with microwave, millimeter wave, or submillimeter wave ranges, but discloses no possible materials for other frequency ranges.

In fact, it has been taught that at infrared and optical frequency ranges, finding appropriate materials for use in forming such media is highly problematic, and at frequencies above $10^{12}$ Hz, frozen mode formation has been considered to be impractical (see, for example, 'Oblique frozen modes in periodic layered media', A. Figotin and I. Vitebskiy, *Physical Review E*, 68, 036609 (2003)).

What is needed in the art are methods and materials for forming anisotropic one-dimensional photonic crystals capable of giving rise to axially frozen modes.

SUMMARY OF THE INVENTION

In one embodiment, the present invention is directed to a method for forming a multi-layered structure. For instance, the method can include providing a first layer composed of an isotropic material. This first layer can also define a plane and a normal that together define an axial system for the multi-layered structure. The method also includes providing a second layer that includes a crystalline material adjacent to the first layer.

In addition, the method for forming the disclosed structures can include canting the geometric axis of the crystalline material with respect to the axial system of the multi-layered structure. This canting induces the crystalline material to posses a permittivity tensor or a permeability tensor with at least one non-zero off-diagonal element and thereby also induces an anisotropic permittivity in the second layer.

The layers can be formed and located adjacent according to any suitable method. For instance, in one embodiment, the crystalline material of the second layer can be grown on a surface of the first layer. In another embodiment, the crystalline material can be a solid crystal, and the crystal can be cut on a bias during the formation process, in order to cant the geometric axis of the crystalline material with respect to the axial system.

The methods of the present invention can also include applying a force or an energy field to the multi-layered structure. For example, a mechanical force, an electrical field, a magnetic field, a thermal field, or a combination thereof can be applied to the structure. This application of a force or energy field can alter the permittivity contrast between the first layer and the second layer. Thus, the application of the force or energy field can create the canted geometric axis and/or can alter the geometric axis through alteration of the permittivity contrast between the two layers, providing tunability to the devices. Moreover, the force and/or energy field can be dynamic, which can cause the induced anisotropic permittivity to likewise be dynamic.

In another embodiment, the present invention is directed to multi-layered structures that can be formed according to the disclosed methods. In particular, due to the induced canted geometric axis of the crystalline material of the second layer with respect to the axial system of the structure, the disclosed structures can exhibit spectral asymmetry. In one particular embodiment, the disclosed devices can exhibit a unidirectional axial frozen or nearly frozen mode.

There are multiple crystalline materials that can be utilized in the disclosed devices. For instance, in addition to solid synthetic and natural crystals, the crystalline material of the disclosed devices can also be a liquid crystal, such as, for instance, a nematic liquid crystal.

The isotropic layer of the device can be any suitable material. For instance, the isotropic layer can be composed of a glass. In one embodiment, the devices can also include a conductor.

In another embodiment, the present invention is directed to methods of controlling photonic energy through utilization of the devices. For instance, the method can include exposing a multi-layered structure as described herein to a wave packet of light having a frequency $\Omega$, a given velocity and a normal incidence to the structure. Following entrance of the wave packet to the structure, the amplitude of the wave packet can increase and the wave packet can produce a unidirectional axial frozen or nearly frozen mode in the multi-layered structure. Accordingly, the devices can be used in one particular embodiment to trap a quantity of photonic energy of the wave packet within the structure.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying figures in which:

FIGS. 2A and 2B show off-axis permittivities for rotated crystals; and

FIG. 3 shows permittivity tensors upon selected rotations;

Repeat use of reference characters in the present specification and drawings is intended to represent the same or analogous features or elements of the present invention.

DETAILED DESCRIPTION OF PREFERRED EMBODIMENTS

Reference will now be made in detail to various embodiments of the invention, one or more examples of which are illustrated in the accompanying Figures. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

For purposes of this disclosure, it should be understood that IEEE conventions for specifying crystallographic axes, rotations about the axes, and $\epsilon$ as the off-diagonal element for the monoclinic classes has been utilized. Such conventions are well understood by one of ordinary skill in the art, and thus are not described in detail herein.

The present invention is generally directed to the crystal physics associated with realizing axially frozen modes (AFM) in media. More specifically, the present invention is directed to methods and materials suitable for use in development of such effects. Disclosed methods include a variety of modalities whereby materials of higher symmetry, such as crystals, for instance, may be rotated or otherwise modified such that they appear in the laboratory system as having off-diagonal $\epsilon$ elements. For instance, methods include spatial and temporal dynamic modification of materials of rhombic, tetragonal, trigonal, or hexagonal crystal classes such that the $\epsilon$ matrix elements in general, and the off-diagonal $\epsilon$ elements in particular, can feature at least one non-zero off-diagonal $\epsilon$ element. Such materials can then be utilized in forming media, and in particular, multi-layered structures, capable of realizing axially frozen modes.

For instance, the present invention discloses examples of structures capable of realizing such effects based on naturally occurring crystalline superlattices. Such novel photonic crystal structures could have a profound effect on nonlinear optics and optical computing. For example, spatial and temporal modulations of such materials could be used in advanced signal processing, among other applications. Structures capable of displaying AFM could have profound effects on optical memory and buffer elements, optical delay lines, highly efficient sensors, isolators, frequency converters, lasers, and amplifiers. Moreover, while much of the following discussion is directed to structures designed for use with electromagnetic energy in the infrared and visible spectrum, i.e., light waves, it should be understood that the disclosed structures are not limited to such an embodiment, and in particular, the disclosed methods and devices are equally suitable for use with electromagnetic waves of longer wavelength, e.g., radio waves, wavelengths utilized in the cellular/wireless technologies, etc.

Figure 5A:
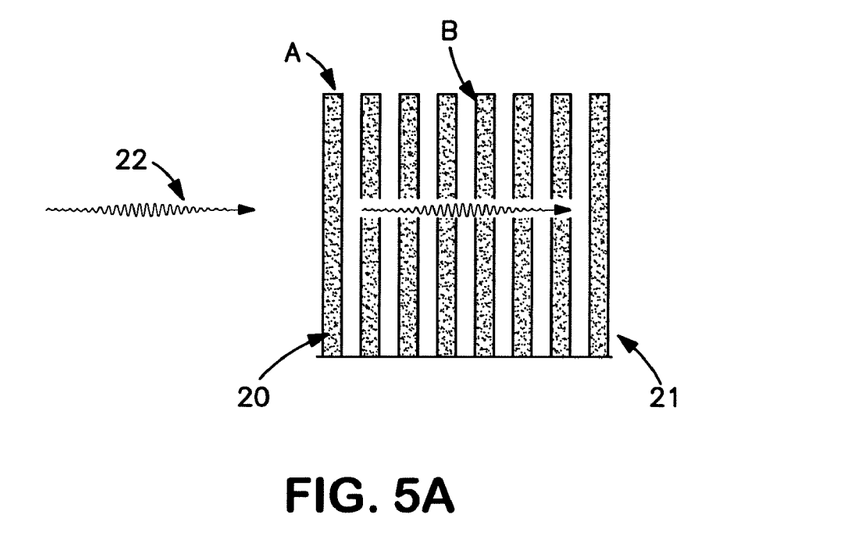
FIGS. 5A and 5B is a schematic illustration of one embodiment of the multi-layer structures of the present invention.
Figure 5B:
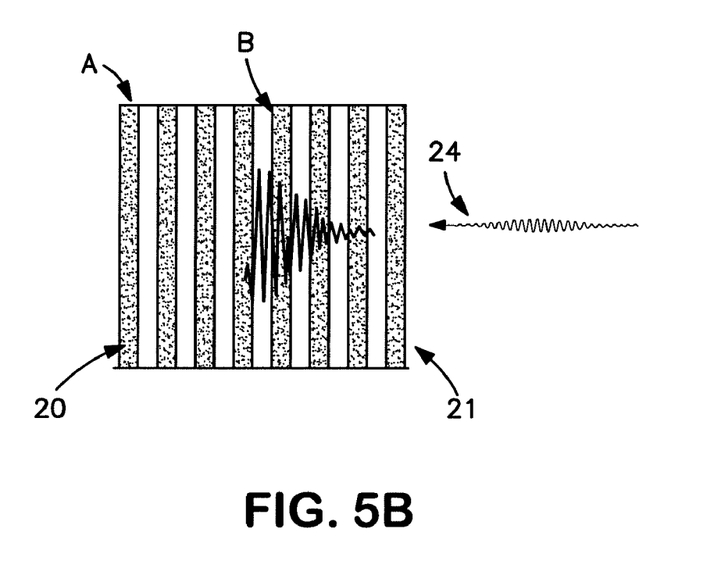

The simplest choice to potentially realize frozen electromagnetic modes in a plane-parallel periodic stack of two materials (i.e., anisotropic material A and isotropic material B as illustrated in FIG. 5) requires that their respective dielectric permittivities, $\epsilon_{ij}$, be $$\epsilon_A = \begin{bmatrix} \epsilon_{A11} & 0 & \epsilon_{A13} \\ 0 & \epsilon_{A22} & 0 \\ \epsilon_{A13} & 0 & \epsilon_{A33} \end{bmatrix}, \epsilon_B = \begin{bmatrix} \epsilon_{B11} & 0 & 0 \\ 0 & \epsilon_{B11} & 0 \\ 0 & 0 & \epsilon_{B11} \end{bmatrix} \quad (1)$$

The more general requirement is as follows:

$$\epsilon_A = \begin{bmatrix} \epsilon_{A11} & \epsilon_{A12} & \epsilon_{A13} \\ \epsilon_{A12} & \epsilon_{A22} & \epsilon_{A23} \\ \epsilon_{A13} & \epsilon_{A23} & \epsilon_{A33} \end{bmatrix}, \epsilon_B = \begin{bmatrix} \epsilon_{B11} & 0 & 0 \\ 0 & \epsilon_{B11} & 0 \\ 0 & 0 & \epsilon_{B11} \end{bmatrix} \quad (2)$$

Therefore, materials that possess an anisotropic dielectric permittivity can fulfill the AFM symmetry criterion.

In accord with one embodiment of the presently disclosed invention, provided herein is a materials perspective to guide the development of practical optical devices based on slowed light. More specifically, according to one embodiment of the present invention, disclosed are a variety of modalities wherein a crystal or other suitable material of higher symmetry can be rotated such that the material appears in the laboratory system as having off-diagonal $\epsilon$ elements, and thus can have a permittivity tensor with at least one non-zero off-diagonal element (i.e., $\epsilon_{12}$ and/or $\epsilon_{23} \neq 0$). In particular, the methods can include rotating or otherwise modifying the material such that the natural geometrical axis is canted with respect to the axial system of a composite structure including the material so as to display the desired off-diagonal $\epsilon$ elements in the material.

According to another embodiment of the invention, disclosed are a variety of modalities wherein a suitable material can be modified through application of one or more forces such that the material appears in the laboratory system as having off-diagonal $\epsilon$ elements, and thus can have a permittivity tensor with at least one non-zero off-diagonal element (i.e., $\epsilon_{12}$ and/or $\epsilon_{23} \neq 0$).

According to another embodiment, the invention is directed to structures including anisotropic materials that can feature the requisite off-diagonal $\epsilon$ elements layered in parallel alignment with isotropic materials. In particular, the structures can include one or more natural and/or synthetic geometrical materials that can exhibit off-diagonal $\epsilon$ elements in layered combination with one or more materials having isotropic permittivity.

In yet another aspect, the present invention is directed to structures including anisotropic materials wherein the $\epsilon$ matrix elements in general, and the off-diagonal $\epsilon$ elements in particular, can be dynamically modified. The disclosed methods for dynamically modulating the off-diagonal $\epsilon$ elements can include temporal and/or spatial variation of the materials, and in particular, those materials utilizing natural or man-made geometrical structures either alone or in combination, and optionally with the addition of forces so as to dynamically modify the off-diagonal $\epsilon$ elements in the materials.

One embodiment of the disclosed multi-layered structures is illustrated in FIGS. 5A and 5B. As can be seen, the structure can include alternating layers of anisotropic material A and isotropic material B. The structure can have any number of layers suitable to the particular application and the characteristics of the materials forming the individual layers. For instance, the structure can have, in one embodiment, just a few layers, for instance, only two or three layers, for instance where the structure is intended to merely alter the nature of the impinging light. In other embodiments, the structure can have many layers, for instance hundreds of layers. In addition, the composite structure can be bounded by two plane faces, 20 and 21, that are perpendicular to the z-direction of the structure. The structures of the present invention can exhibit spectral asymmetry and in one embodiment can exhibit unidirectional AFM capability. For example, according to one embodiment of the present invention a first wave packet 22 of frequency $\Omega$ and normal incidence to the structure can impinge upon plane 20 and freely propagate through the structure as shown at FIG. 5A. In contrast, a second wave packet 24 of the same frequency $\Omega$ but opposite direction that impinges upon face 21 with normal incidence to the structure can become trapped after entering the structure with its amplitude increasing sharply, as shown in FIG. 5B. In particular, wave packet 24 can produce the frozen or nearly frozen mode, with negligible group velocity, and the wave packet 24 can slow dramatically after entering the slab.

Materials of the disclosed structures can include natural crystalline materials as well as man-made (i.e., man-made) materials. For example, the disclosed structures can include natural or synthetic solid or liquid crystals in which the desired off-diagonal $\epsilon$ elements do not originally exist but can be created. In one embodiment, crystalline materials that can be prepared in a thin film form can be utilized.

For purposes of the present invention, the term "thin film" is herein defined to include layers of less than about 100 µm in depth and formed of any material. In certain embodiments, thin films can be even thinner, for instance on the order of 1 µm, or even less, down to and including monolayers, in other embodiments. Such layer thicknesses may be preferred, for instance in 'high-tech' applications, for instance when considering applications directed to controlling and/or altering light in the infrared through the visible spectrum. Thin films of the invention can be formed according to methods as are known to those of skill in the art including, without limitation, vacuum evaporation techniques, pyrolytic decomposition, sputtering, plasma deposition, and the like.

According to one embodiment, solid crystals capable of being accurately cut on a bias (i.e., any angle other than that which defines the crystal axis of the material) and layered with an isotropic material can be utilized in the multi-layered structures. Other factors that can be considered in selecting a suitable crystalline material for the disclosed structures can include deposition constraints, lattice matching, and orientation of crystal growth. For example, certain natural materials, such as ZnO and $Mg_xZn_{1-x}O$, usually grow with the polar axis at an angle with respect to the substrate normal, with the particular angle depending upon deposition conditions. Such material formation characteristics should be taken into account when utilizing a natural crystal material, in particular in those embodiments wherein the process for forming the structures includes rotation to obtain the desired off-diagonal $\epsilon$ elements in the anisotropic materials.

A non-limiting list of natural solid crystals that can be utilized in the present invention to form the anisotropic layers of the disclosed structures can include antimony sulfoiodide (SbSI), barium titanate ($BaTiO_3$), yttrium orthovanadate ($YVO_4$), members of the langasite family (e.g., $La_3Nb_{0.5}Ga_{5.5}O_{14}$, $La_3Ta_{0.5}Ga_{5.5}O_{14}$ $La_3SbZn_3Ge_2O_{14}$), and the like.

Optionally, the disclosed structures capable of displaying AFM can include one or more synthetic, or man-made materials. For instance, both synthetic solid crystals and liquid crystals are encompassed by the present invention. Synthetic solid crystals of the invention can include, for example, parallel, hexagonally close-packed rods imbedded in a polymer matrix, 3-1 composites, and the like. The concept and numbering of composite synthetic dielectrics is further described by S. M. Pilgrim and R. E. Newnham in "3-0: A New Composite Connectivity," *Proceedings of the ISAF*, pp. 314-317 (1986), and by R. E. Newnham and L. E. Cross in "Tailored Domains in Quartz and Other Peizoelectrics," *Proc. of the Thirtieth Annual Symposium on Frequency Control*, pp. 71-77 (1976), both of which are incorporated herein by reference.

In one embodiment, the disclosed structures can include one or more layers of liquid crystals that can be processed so as to develop the desired off-diagonal $\epsilon$ elements. For example, a synthetic liquid crystal (LC) such as nematic p-n-pentyl-p'-cyanobiphynyl (5CB), or nematic p-n-methoxy-benzilidene-p'-n-butylanaline (MBBA) can be utilized.

Nematic liquid crystals, the phase of a liquid crystal characterized by arrangement of the long axes of the molecules in parallel lines but not layers, can be preferred in one embodiment of the invention. In particular, and as described in detail by P. Klysubun ("Nonlinear Optical Studies of Dye-doped Nematic Liquid Crystals," PhD Dissertation (Physics), Virginia Polytechnic Institute and State University, Blacksburg, Va., March 2002), nematic LCs have only orientational order, and thus can possess infinite-fold rotational symmetry around the director as well as 3-D translational order. In addition, the physical properties of a nematic LC will remain unchanged under the inversion of the director (termed the nematic symmetry) and have no polar axis. In particular, the nematic symmetry will be present even when the constituent molecules are polar, because the molecules will form anti-parallel pairs in order to minimize the intermolecular interaction energy, such as that originating from Van der Waals forces. Moreover, as nematic LCs are centrosymmetric, they generally do not exhibit second-order nonlinear optical effects such as second harmonic generation (SHG) or linear electro-optic effects, as do some noncentrosymmetric smectic LCs. SHG has been observed in nematic systems, however, due to the presence of optical field gradient and/or flexoelectric deformation of the system. SHG can also occur in nematic LCs at the interfacial region where the antiparallel pairing of LC molecules has been broken. The Van Dyke matrix for a nematic LC is given below:

$$\begin{pmatrix} c_{11} & c_{12} & c_{13} & 0 & 0 & 0 & 0 & 0 & 0 \\ c_{12} & c_{11} & c_{13} & 0 & 0 & 0 & 0 & 0 & 0 \\ c_{13} & c_{13} & c_{33} & 0 & 0 & 0 & 0 & 0 & 0 \\ 0 & 0 & 0 & c_{44} & 0 & 0 & 0 & 0 & 0 \\ 0 & 0 & 0 & 0 & c_{44} & 0 & 0 & 0 & 0 \\ 0 & 0 & 0 & 0 & 0 & c_{66} & 0 & 0 & 0 \\ 0 & 0 & 0 & 0 & 0 & 0 & \varepsilon_{11} & 0 & 0 \\ 0 & 0 & 0 & 0 & 0 & 0 & 0 & \varepsilon_{11} & 0 \\ 0 & 0 & 0 & 0 & 0 & 0 & 0 & 0 & \varepsilon_{33} \end{pmatrix}$$

$$2c_{66} = (c_{11} - c_{12}).$$

The Van Dyke matrix for nematic LCs therefore is identical to that of crystals possessing point group symmetry 6/m mm ($D_{6h}$) or 6/m ($C_{6h}$); i.e., the two non-piezoelectric hexagonal classes.

Nematic LCs are sensitive to reorientation by an imposed electric field, and therefore afford the possibility of varying, both spatially and temporally, the characteristics of the photonic crystal structure.

Nematic LCs are not a requirement of the LCs of the invention however, and smectic and/or cholesteric LCs can be utilized in other embodiments of the invention. For example, no matter what type of LC is utilized, if the LC molecules are cigar-shaped, with $X_3$ along the long direction, $\epsilon_{33}$ will be different from $\epsilon_{22} = \epsilon_{11}$ and the permittivity tensor can exhibit ∞mm point symmetry.

In one embodiment of the present invention, composite materials can be used in forming the disclosed structures. For example, in one embodiment, the structure can include one or more layers of a composite material in which the desired off-diagonal ϵ elements can be created including a liquid crystal combined with one or more polymers. For example, a polymer-dispersed liquid crystal (PDLCs) can be developed, in which LC droplets on the order of microns or submicrons are embedded in a polymeric matrix. Such materials have been described in, for example, U.S. Pat. No. 6,036,882, to Chung, U.S. Pat. No. 5,906,770, to Amundson, et al., and U.S. Pat. No. 5,494,604, to Chung, all of which are incorporated herein by reference. In one embodiment, such an LC/polymer composite material can be prepared utilizing any or all of temperature-induced, solvent-induced, or polymerization-induced phase separation. In general, the size of a liquid crystal droplet in the matrix can be controlled by adjusting the rate of phase separation. In another embodiment, a microencapsulation process as is generally known in the art can be used to form a liquid crystal/polymer composite for use in the disclosed structures.

In another embodiment, polymer-stabilized liquid crystals (PSLCs), in which a small amount of polymer is dispersed in a liquid crystal matrix, can be utilized in the disclosed structures. PSLCs can be prepared in one embodiment by first dissolving a small amount of polymeric monomer in a liquid crystal, and then polymerizing the monomer, for example through a photopolymerization process using ultraviolet radiation in the presence of photoinitiator.

In yet another embodiment, a material suitable to form individual layers of the disclosed structures can include nanoparticles dispersed in a liquid matrix. Such a material can display LC properties, and in particular can display characteristics similar to an LC when subjected to an electric field. For example, in one embodiment, one or more individual layers of the disclosed structures can be formed of a material including nanotubes (e.g., carbon nanotubes) dispersed in a suitable liquid matrix.

In another embodiment, an individual layer of the disclosed structures can be formed of a material including nanoparticles dispersed in a solid matrix. For example, nanotubes dispersed in a solid polymeric matrix. According to this embodiment, the properties of the material may not be variable, but should obey "moderation" conditions, as is generally known in the art.

In another embodiment, the structure can include one or more solid polymeric dielectric layers that can be, for example, formed on an isotropic substrate. According to this embodiment, a polymeric dielectric layer can then be processed so as to exhibit the desired permittivity tensors and function as an anisotropic layer in the composite structure. For example, individual electro-optic polymers could be 'stacked' and either deposited at a suitable angle to the substrate or optionally the angle of the polymers to the substrate could be altered (i.e., poled) following deposition so as to establish an overall geometrical axis of the layer that is properly canted with respect to the axial system of the composite structure including the polymer layer so as to yield the requisite permittivity tensor displaying off-diagonal ϵ elements in the polymer layer.

Figure 4A:
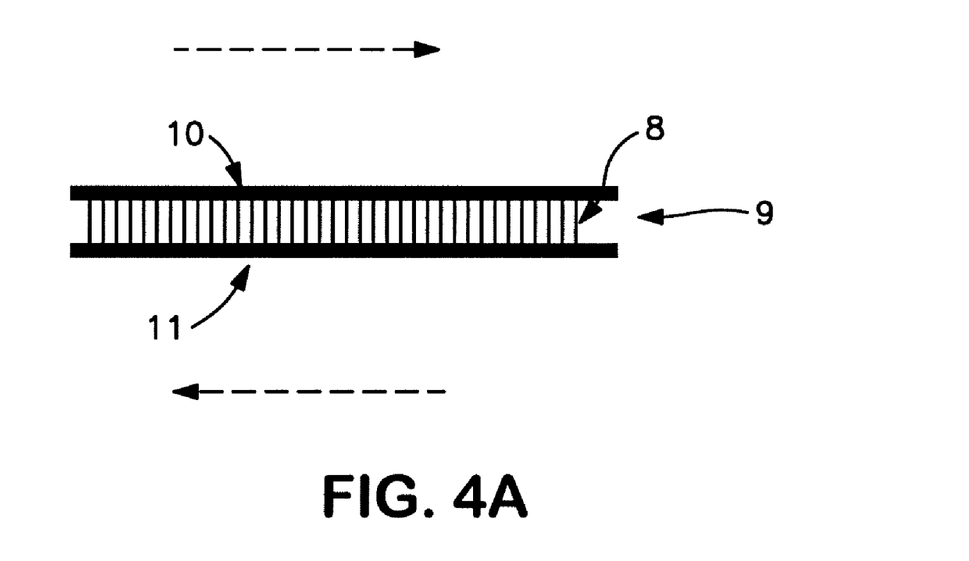
FIGS. 4A and 4B illustrates one embodiment of a process for forming a solid polymer matrix including off-diagonal E elements.
Figure 4B:
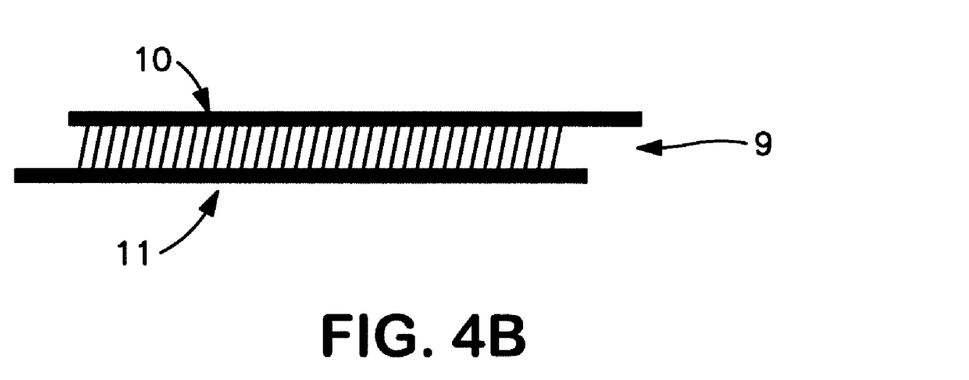

For instance, in one particular embodiment and as illustrated in FIGS. 4A and 4B, such a solid polymeric dielectric layer could be formed according to a process including first, attaching the individual polymer molecules 8 that can form the dielectric layer 9 to two parallel substrates, 10, 11 as shown in FIG. 4A. In particular, the substrates 10, 11 can be composed of an isotropic material, such as glass, for inclusion in the final structure capable of displaying AFM. Following deposition and attachment at both sides of the dielectric layer via, e.g., chemical vapor deposition (CVD) methods, or the like, the multi-layered structure including both substrates 10, 11 and the dielectric layer 9, can be brought to the proper temperature for application of a mechanical shearing force (illustrated by the dashed arrows in FIG. 4A) in order to place the 'stack' of individual polymer molecules 8 forming dielectric layer 9 at the desired angle, as shown in FIG. 4B. Following application of the force, the temperature of the composite structure can be reduced, and the solid dielectric layer 9 thus formed can function as an anisotropic layer of the composite structure capable of displaying AFM. Obviously, such a process can be applied to either an individual dielectric layer with adjacent isotropic layers or optionally to multiple layers in a single process, as desired. Possible polymers include polyvinyl chloride (PVC) polyvinyl fluoride (PVF), polyvinylidene fluoride (PVDF), polymethyl glutamate, or any other polymer that can be formed according to polymeric formation methods as are known to those of skill in the art to describe a high crystallinity.

The isotropic material that can be layered with the anisotropic material can generally be any suitable isotropic material displaying the desired optical characteristics. For example, in one preferred embodiment, an optical grade glass can be layered with the anisotropic material to form the composite structures. Optical grade glass can be preferred in many embodiments due to simple economic considerations. Other suitable isotropic materials can include, without limitation, lead titanate glass, soda lime glass, borosilicate glass (Pyrex®), 96% silica glass (Vycor®), potash soda lead glass, lead barium glass, etc.

According to one embodiment of the invention, off-diagonal ϵ elements can be created in a suitable material such as those exemplary materials described above through particular rotation of the material. As is generally known in the art, second rank tensors can be represented as an ellipsoid in n-dimensional space. For n=3 (the present case), with respect to refractive indices and dielectric constants, this leads to the optical indicatrix. If the crystal is of any cubic point group, the indicatrix is a sphere (i.e., isotropic), and therefore, there are no off-diagonal permittivities. However, for any other case, a general rotation will produce a permittivity matrix where all elements are present.

Figure 1:
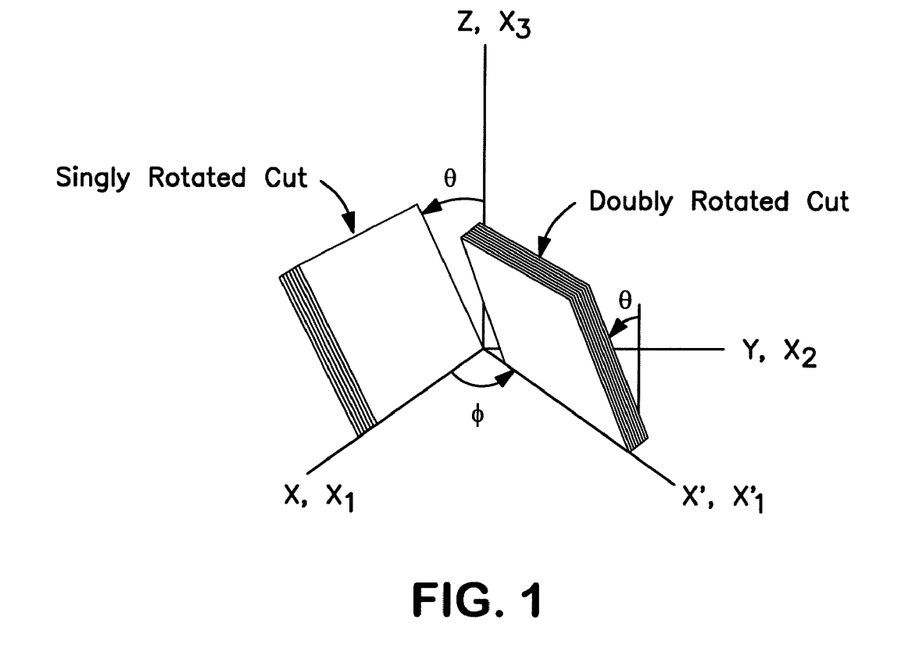
FIG. 1 is a schematic representation of singly and doubly-rotated cuts with respect to the IEEE standard crystallographic axes.

By definition, the three Euler angles are: $\phi$ (first rotation about the $X_3$ axis), $\theta$ (second rotation about the resulting $X_1$ axis), and $\Psi$ (third rotation about the resulting $X_2$ axis), which will be specified here as: $\{\phi\ \theta\ \Psi\}$, and as can be seen with reference to FIG. 1. When any of these angles is not zero, it is assumed herein that its value is such that it does not make a resulting axis coincide with a symmetry axis of the crystal. The initial orientation is $\{\phi\ \theta\ \Psi\}=\{0\ 0\ 0\}$; this aligns the axes with the IEEE convention for each crystal class and with the laboratory coordinate system.

The $[\epsilon]$ matrix varies only with the crystal systems (not with the point groups). These systems are:

System I=triclinic classes $[\epsilon_{11}\ \epsilon_{22}\ \epsilon_{33}\ \epsilon_{13}\ \epsilon_{12}]$ System II=monoclinic classes $[\epsilon_{11}\ \epsilon_{22}\ \epsilon_{33}\ 0\ \epsilon_{13}\ 0]$ System III=orthorhombic classes $[\epsilon_{11}\ \epsilon_{22}\ \epsilon_{33}\ 0\ 0\ 0]$ System IV, V, VI=tetragonal, trigonal, hexagonal classes $[\epsilon_{11}\ \epsilon_{11}\ \epsilon_{33}\ 0\ 0\ 0]$ System VII=cubic classes $[\epsilon_{11}\ \epsilon_{11}\ \epsilon_{11}\ 0\ 0\ 0]$ When considering the presently disclosed materials, there are eight angle combinations of interest:

$\{\phi\ \theta\ \Psi\}=\{0\ 0\ 0\};\ \{\phi\ 0\ 0\};\ \{0\ \theta\ 0\};\ \{0\ 0\ \Psi\};\ \{0\ \theta\ \Psi\};$
$\{\phi\ 0\ \Psi\};\ \{\phi\ \theta\ 0\};\ \{\phi\ \theta\ \Psi\}$ When these angle combinations are applied to the term schemes for the Systems II-VI, one arrives at FIGS. 2A and 2B, which lists the resulting off-axis permittivity elements (FIG. 2A consists of either no rotations, or one rotation; FIG. 2B consists of either two rotations or three rotations; primes denoting rotated values are omitted).

One sees that there are three cases where no off-diagonal elements exist, nine cases where one off-diagonal element exists; and twelve cases where all three off-diagonals exist. It is interesting to note that in none of the 24 cases is there an instance where there are two off-diagonal elements and one zero element.

In Systems III-VI where $\epsilon_{13}$ is absent, single rotations lead to $\epsilon_{jk}'$ elements maximized at 45°, with values equal to one-half the difference of the two principal elements. For the monoclinic classes, a single $\Psi$ rotation maximizes $\epsilon_{13}'$ at $\Psi=\{45°-\frac{1}{2}\tan^{-1}[2\epsilon_{13}/(\epsilon_{11}-\epsilon_{33})]\}$. At 45°, the matrices for the $\{\phi\ 0\ 0\}$, $\{0\ \theta\ 0\}$, $\{0\ 0\ \Psi\}$ rotations for the five systems are given in FIG. 3. Results for double and triple rotations are obtained straightforwardly, but are somewhat more cumbersome. Rotations described here represent angular displacements of the crystal axes representing one material of the stack with respect to the reference axial set defined by the stack plane and normal (i.e., the laboratory system).

In one embodiment of the invention, off-diagonal $\epsilon$ elements can be created in a suitable material through the additional application of one or more forces to the composite structure. In particular, the structure may be initially unoriented, or alternatively may be oriented as described above prior to the application of one or more forces. The application of force to a material can be utilized to alter or reorient the material's domains and thereby form a permittivity tensor displaying a non-zero off-diagonal $\epsilon$ element in the material.

In one embodiment, force in the form of an electric field can be applied to a structure, so as to enhance or create the desired $\epsilon$ elements. For example, in one embodiment, a global electric field can be established across the entire structure via an electrode system near opposite sides of the entire structure. In another embodiment, a local electric field can be established with the application of electrodes across just one or optionally a few layers of the entire structure. This may be preferred in those embodiments wherein it is desirable to establish different anisotropic characteristics in the individual material layers forming the entire structure, perhaps as a function of the structure z-direction, rather than establish the same optical characteristics in every anisotropic layer of the entire stack.

In one embodiment, a transparent conductor can be utilized to establish an electric field across all or a portion of a multi-layer structure. For example, indium tin oxide (ITO) or magnesium zinc oxide ($Mg_xZn_{x-1}O$) are transparent conductors that can be utilized to establish an electrode structure without interfering with the optics of the structure. In general, the transparent conductor can be located (for instance through deposition) on two isotropic layers (e.g., glass) to form electrodes so as to produce an electric field in the space between the electrodes. In addition, it may be preferred in some embodiments to offset the two electrodes in the x or y-direction, so that the resulting electric field is not along the z axis (defined for purposes of this disclosure as the axis normal to the plane of the individual parallel layers forming the structure), but is at an angle. In one embodiment, the electrodes can be patterned, as with surface acoustic wave interdigital transducer fingers, so as to establish the desired characteristics in the electric field.

In one particular embodiment, an electric field can be utilized in conjunction with one or more LC layers to form the disclosed multi-layer structures. As is generally known in the art, an electric field applied to an LC can distort the liquid crystal's director (see, for Example, P. Klysubun, previously incorporated by reference). For example, in a liquid crystal with positive dielectric anisotropy, application of an electric field will rotate the director to become parallel to the field. However, for any distortion to occur, the strength of the applied field must be larger than a certain threshold, known as the Freedericksz threshold, in order to overcome the elastic and viscoelastic forces of the liquid crystal. This transition from an undistorted director configuration to a distorted one is called the Freedericksz transition or the Freedericksz effect. Since this effect originates from the liquid crystal collective reorientation, it is nonlinear with the strength of the applied field (above the Freedericksz threshold), and gives rise to a large nonlinear response that has been referred to as "Giant Optical Nonlinearity" (GON).

In addition to coupling with the LC director field directly, as described above, an applied electric field can also indirectly interact with the director field by means of the spontaneous dielectric polarization that arises from the director field distortion. This is called the flexoelectric effect, which is analogous to the piezoelectric effect in solids.

Thus, the imposition of an electric field on an LC with positive dielectric anisotropy can be utilized to rotate the effective E element seen in the layered coordinate structure and thus establish a permittivity tensor referred to the laboratory system with at least one non-zero off-diagonal element (i.e., $\epsilon_{12}$ and/or $\epsilon_{23}\neq 0$).

Other types of forces can also be utilized to establish the desired optical effects in the anisotropic layers of the disclosed structures, in addition to electrical forces. For instance, in one embodiment, mechanical forces can be utilized, for example to establish stress-induced phase transitions, as with ferrobielastic piezoelectric materials.

Other forces encompassed by the invention can include magnetic forces, in which the permeability tensor, $\mu$, can be changed rather than the permittivity tensor, $\epsilon$, but with the same overall effect on the materials, i.e., they will be induced to display anisotropic characteristics with respect to the axial system defined by the isotropic layer(s) of the structure. For example, a magnetic field can be utilized to establish the desired effects by use of magnetic needles dispersed in a fluid layer that can then be oriented as described above upon establishment of a magnetic field, or through utilization of particular materials, e.g., Terfenol-D® materials, in which the $\mu$ tensor varies with the strength of the applied magnetic field.

Force can optionally be applied to the disclosed structures through the use of thermal fields or electromagnetic fields. For example, an applied thermal field can be utilized to induce a temperature-induced, austenitic-martinsitic phase transition that can rotate or otherwise alter the $\mu$ tensor and establish the desired anisotropic effect in the material.

In another embodiment, combinations of forces and/or fields can be utilized and/or spatial gradients of one or more particular force and/or field type.

The above discussions have concentrated on the necessary conditions for achieving an AFM structure, stressing the fact that off-diagonal terms in the permittivity matrix can be achieved by a suitable crystal reorientation via rotation and/or the application of forces. Additional conditions of the materials can be developed in certain embodiments of the invention so as to assure that the achieved AFM regime is robust and detectable. For instance, in one embodiment, the material constituting the anisotropic layers can have a ratio of maximum to minimum $\epsilon_{kk}$ in the range of between about 2 and about 10. In another embodiment, the permittivity contrast in adjacent layers can be in a ratio in the approximate range of between about 1.5 and about 20. In another embodiment, typical layer thickness can be of the order ($\lambda/4n$), where $\lambda$ is the light wavelength in vacuum and $n$ is the refractive index. These additional physical constraints are by no means insuperable obstacles, although some care may be required in selecting the requisite materials.

The preferred layer thickness and number of layers for any particular application with obviously vary in light of the characteristics of the materials used, the nature of the light to be controlled, etc. For instance, the thickness of the layers can be measured in nanometers or meters, depending upon the nature of the electromagnetic wave to be controlled and the material forming the layers. Similarly, the preferred number of layers can vary from two or three up to several hundreds, depending upon the specific application.

Of importance in regard to the materials and methods of the present invention, while any crystalline material in Systems III to VI fails to meet the off-diagonal AFM criterion when viewed in its reference coordinates, when the same material is viewed in a coordinate system arbitrarily displaced from the principal axial set, the material can display the effective permittivity matrix $\epsilon_A$ of Eq. (2), and thus can meet the AFM symmetry condition. Of course, as will be understood by one of ordinary skill in the art, the practical fabrication of AFM lattices by growing multi-layer, multi-material crystalline lattices can pose difficulties, for example due to the fact that one typically needs well-matched lattice fits to ensure good epitaxy and, therefore, low optical loss.

It is often the case with current thin-film deposition technology that the crystal axes of the epi-layers are parallel to the axes of the stack, thereby failing the AFM criterion, although notable exceptions do exist, such as ZnO growth on various substrates. Prescinding from fabrication difficulties, however, the task then is one of selecting materials with the requisite differences in principal axes $\epsilon_{ii}$ values.

One embodiment of systems that could exhibit visible and microwave frozen electromagnetic modes, respectively, include antimony sulfoiodide (SbSI)/glass and barium titanate (BaTiO$_3$)/glass; i.e., these materials satisfy both the symmetry condition (Eqns. 1 and 2) as well as the "moderation" condition relating to the ratio of permittivity eigenvalues being between roughly 2 and 10.

The permittivities at optical frequencies for SbSI (mmm/mm2) (terminology according to, "Draft 16 of A Working Document for a Proposed Standard to be entitled: IEEE Standard Definitions of Terms Associated with Ferroelectric and Related Materials," IEEE Trans. Ultrasonics, Ferro., Freq. Contr. 50, 1613-1647 (2003), which is incorporated herein by reference as to all relevant material) and glass (isotropic) can be computed from the refractive indices: $n_x=2.87$, $n_y=3.63$, and $n_z=4.55$ (measured at 633 nm); whereas for glass, the refractive index in the visible is approximately 1.46. The SbSI permittivity eigenvalues computed from these index values are: $\epsilon_{11}=72.9$ pF/m, $\epsilon_{22}=116.7$ pF/m, $\epsilon_{33}=183.3$ pF/m. For a superlattice of $\Psi=45°$-oriented SbSI and isotropic glass film layers, the symmetry condition given in FIG. 3 is met as is the moderation condition since $(4.55/2.87)^2=2.8$. More specifically the 45° rotated permittivity matrices are, with units of pF/m:

$$\varepsilon_{SbSI} = \begin{bmatrix} 128.1 & 0 & -55.2 \\ 0 & 116.7 & 0 \\ -55.2 & 0 & 128.1 \end{bmatrix}, \varepsilon_{glass} = \begin{bmatrix} 18.9 & 0 & 0 \\ 0 & 18.9 & 0 \\ 0 & 0 & 18.9 \end{bmatrix}, \quad (3)$$

Since Maxwell's equations are scale-invariant, it is illustrative also to consider a microwave AFM structure. In this case, one can consider a lattice comprised of alternating sheets of barium titanate (BaTiO$_3$) and glass; the reduction from optical to microwave frequencies considerably eases the construction of the AFM device by traditional means, because of the magnification of the physical dimensions. Single-crystal BaTiO$_3$ possesses a perovskite structure (point group 4 mm) with microwave permittivities of approximately $\epsilon_{11}=39$ nF/m, $\epsilon_{33}=1.7$ nF/m; i.e., there is considerable anisotropy. Similar remarks pertain to poled polycrystalline BaTiO$_3$ ceramic (point group 6 mm). For glass, the microwave permittivity is about 0.05 nF/m, so that $\Psi=45°$-oriented BaTiO$_3$ (BT) slabs layered between glass plates, the microwave permittivity matrices would be:

$$\varepsilon_{BT} = \begin{bmatrix} 20.4 & 0 & 18.7 \\ 0 & 39 & 0 \\ 18.7 & 0 & 20.4 \end{bmatrix}, \varepsilon_{glass} = \begin{bmatrix} 0.05 & 0 & 0 \\ 0 & 0.05 & 0 \\ 0 & 0 & 0.05 \end{bmatrix}, \quad (4)$$

also satisfying the AFM requirements of Eq. (1).

In one embodiment, the disclosed invention is directed to methods for dynamically modulating the off-diagonal $\epsilon$ elements in the disclosed structures. In particular, according to this embodiment, the multi-layered structures can include the utilization of materials in which the off-diagonal $\epsilon$ elements can not only be established, as described above, but can also be dynamically modulated, such as through application of one or more particular forces. For example, in one embodiment, the structure can include anisotropic ferroelectric films, in which the domains can be altered upon application of an electric field. In one particular embodiment, a pulsing electric field can be established so as to dynamically modulate the permittivity matrix of the material.

In another embodiment, the structure can include one or more piezo-materials, in which $(\epsilon^T-\epsilon^s)=ed^t$ is the product of two piezoelectric constants, matrices, as further described in Transactions on Ultrasonics, Ferroelectrics and Frequency Control (T-UFFC, 42, 916, 9/95). For example, dynamic modulation of the off-diagonal $\epsilon$ elements in one or more layers of the structures can be effected through alteration of the electric boundary conditions, and $k^2=e^2/(\epsilon c)$, the piezoelectric coupling coefficient, is a measure of the size of the effect.

In another embodiment, and in particular in those embodiments wherein the structure includes LC anisotropic layers, the off-diagonal $\epsilon$ elements in one or more LC layers of the structures can be dynamically modulated through modulation of the piezo-optic and/or electro-optic effects discussed above in regard to initial establishment of the off-diagonal $\epsilon$ elements.

In another embodiment, the structures can include particular anisotropic materials that can be dynamically modulated with the desired effects on the permittivity matrix of the material. For instance, the structures can include anisotropic materials in which a pulsed electric, magnetic, or electromagnetic field can reorient the terms in the permittivity matrix. For example, the structures can include one or more layers of piezo-nonsymmetric materials, such as piezo-nonsymmetric oxides described by P. Shiv Halasyamani and Kenneth R. Poeppelmeier ("Noncentrosymmetric Oxides," Chem. Mater., 10(10), pp. 2753-2769, 1998). In other embodiments, the structures can optionally include one or more layers including electro-optic materials or other non-linear materials as are generally known in the art in which the terms in the permittivity matrix can be oriented or reoriented upon application and/or removal of force.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention. Further, it is recognized that many embodiments may be conceived that do not achieve all of the advantages of some embodiments, yet the absence of a particular advantage shall not be construed to necessarily mean that such an embodiment is outside the scope of the present invention.

What we claim is:

1. A method for forming a multi-layered structure comprising:
    providing a first layer composed of an isotropic material, wherein the first layer defines a plane and a normal that together define an axial system for the multi-layered structure;
    providing a second layer adjacent to the first layer, wherein the second layer includes a crystalline material; and
    canting the geometric axis of the crystalline material with respect to the axial system of the multi-layered structure, wherein said canting induces the crystalline material to possess a permittivity tensor or a permeability tensor with at least one non-zero off-diagonal element and said canting induces an anisotropic permittivity in said second layer.

2. The method, as recited in claim 1, further comprising growing the crystalline material of the second layer on a surface of the first layer.

3. The method, as recited in claim 1, wherein the crystalline material is a solid crystal, wherein the step of canting the geometric axis of the crystalline material comprises cutting the solid crystal on a bias.

4. The method, as recited in claim 1, further comprising applying a force or an energy field to the multi-layered structure.

5. The method, as recited in claim 4, wherein the force or energy field is selected from the group consisting of a mechanical force, an electrical field, a magnetic field, a thermal field, and combinations thereof.

6. The method, as recited in claim 4, the application of a force or energy field alters the permittivity contrast between the first layer and the second layer.

7. The method, as recited in claim 6, wherein the force or energy field is a dynamic force or energy field and the induced anisotropic permittivity is thereby dynamic.

8. The method, as recited in claim 4, wherein the application of the force or energy field causes the canting of the geometric axis of the crystalline material with respect to the axial system of the multi-layered structure.

9. A multi-layered structure comprising:
    a first layer having isotropic permittivity, said first layer defining an axial system for the multi-layered structure;
    a second layer displaying an induced anisotropic permittivity, wherein the second layer is composed of a crystalline material having a geometric axis that is canted with respect to the axial system of the multi-layered structure, wherein said crystalline material has been induced to possess a permittivity tensor or a permeability tensor with at least one non-zero off-diagonal element as a result of the canted geometric axis of the crystalline material and there is thereby an induced permittivity contrast between the first layer and the second layer; and
    wherein the multi-layered structure exhibits spectral asymmetry.

10. The multi-layered structure, as recited in claim 9, wherein the multi-layered structure exhibits a unidirectional axial frozen or nearly frozen mode.

11. The multi-layered structure, as recited in claim 9, wherein the multi-layered structure is under the influence of at least one force or energy field, wherein the at least one force or energy field alters the permittivity contrast between the first layer and the second layer.

12. The multi-layered structure, as recited in claim 9, wherein the crystalline material is a natural crystal cut on a bias.

13. The multi-layered structure, as recited in claim 9, wherein the crystalline material is a liquid crystal.

14. The multi-layered structure, as recited in claim 13, wherein the liquid crystal is a nematic liquid crystal.

15. The multi-layered structure, as recited in claim 9, wherein the first layer is composed of a glass.

16. The multi-layered structure, as recited in claim 9, further comprising a conductor.

17. The multi-layered structure, as recited in claim 9, wherein said second layer has a ratio of maximum to minimum $\epsilon_{kk}$ between about 2 and about 10.

18. The multi-layered structure, as recited in claim 9, wherein the induced permittivity contrast between the first layer and the second layer has a ratio of between about 1.5 and about 20.

19. The multi-layered structure, as recited in claim 9, wherein the thickness of the first or the second layer is about $\lambda/4n$;

wherein,
$\lambda$ the wavelength of light in a vacuum, and
n is the refractive index of the layer.

20. A method of controlling photonic energy comprising:
providing a multi-layered photonic structure including a first layer having isotropic permittivity and a second layer displaying an induced anisotropic permittivity;
exposing said structure to a wave packet of light, said wave packet of light having a frequency $\Omega$, a given velocity and a normal incidence to said structure;
increasing the amplitude of said wave packet subsequent to said wave packet entering the multi-layered photonic structure;
producing a unidirectional axial frozen or nearly frozen mode in said multi-layered structure from said wave packet, said unidirectional axial frozen or nearly frozen mode having a group velocity that is less than said given velocity; and
trapping a quantity of the photonic energy of the wave packet within said structure.

* * * * *